United States Patent Office
3,230,215
Patented Jan. 18, 1966

3,230,215
2,3-EPITHIO-STEROIDS AND PRODUCTION THEREOF
Taichiro Komeno, Osaka, Japan, assignor to Shionogi & Co., Ltd., Osaka, Japan
No Drawing. Filed Aug. 17, 1964, Ser. No. 390,233
Claims priority, application Japan, Dec. 19, 1961, 36/46,266
25 Claims. (Cl. 260—239.5)

This application is a continuation-in-part of application Serial No. 366,594, filed May 11, 1964, which is a continuation-in-part of applications Ser. Nos. 244,876 and 327,481, filed December 17, 1962 and December 2, 1963, respectively (all said applications being now abandoned).

The present invention relates to 2,3-epithio-steroids having the following formula:

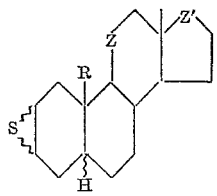
(I)

and production thereof. In the above Formula I, the ripple mark ($) represents α- or β-configuration, R is hydrogen or methyl, Z is methylene, hydroxymethylene or carbonyl and Z' is carbonyl or a group of the

in which R' is lower alkyl, hydroxy, acyloxy, acetyl, hydroxyacetyl or acyloxyacetyl and R" is hydrogen, lower alkyl, lower alkenyl, lower alkynyl, hydroxy or acyloxy. The acyl moiety in the said groups is preferably derived from carboxylic acids having from one to about twelve carbon atoms, conventionally employed in the steroid art, and having a molecular weight less than about 200. Representative of the acyl moiety which can be present are lower alkanoyl (e.g. formyl, acetyl, propionyl, butyryl, isobutylryl, caproyl, heptanoyl, octanoyl, trimethylacetyl), lower alkenoyl (e.g. crotonoyl, undecenoyl), carboxy-(lower)alkanoyl (e.g. succinyl), cycloalkyl(lower)alkanoyl (e.g. β-cyclopentylpropionyl, β-cyclohexylpropionyl), mono carbocyclic aroyl (e.g. benzoyl, p-toluyl, p-nitrobenzoyl, 3,4,5-trimethoxybenzoyl), monocarbocyclic aryl(lower)alkanoyl or alkenoyl (e.g. phenylacetyl, β-phenylpropionyl, cinnamoyl) and monocarbocyclic aryloxy(lower)alkanoyl (e.g. p-chlorophenoxyacetyl).

It is a basic object of the present invention to embody 2,3-epithio-steroids of formula I. Another object of this invention is to embody steroids having specific physiological activities. A further object of the invention is to embody a process for converting 2,3-epoxy-steroids into 2,3-epithio-steroids. These and other objects will be apparent to those conversant with the art to which the present invention pertains from the subsequent description.

The process of the present invention is represented by the following formulae:

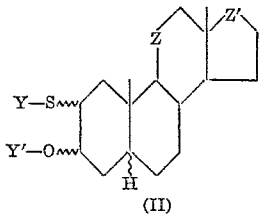
(II)

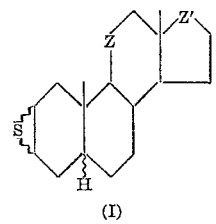
(I)

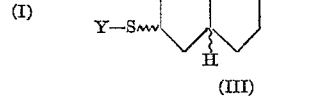
(III)

wherein Y is cyano, lower alkanoyl or lower alkoxythiocarbonyl, Y' is hydrogen, lower alkanoyl, lower alkylsulfonyl, phenylsulfonyl or lower alkylphenylsulfonyl and R, Z and Z' each has the same significance as designated above.

The starting material (II or III) can be prepared from the corresponding 2,3-epoxy-steroid by a variety of methods. Some of the methods are illustratively representable by the following scheme showing only the A-ring of the steroid skeleton:

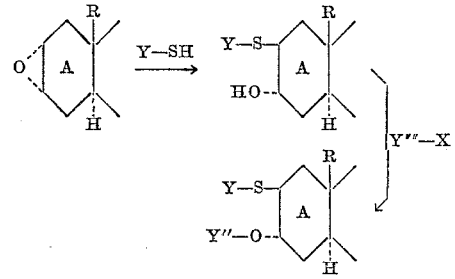

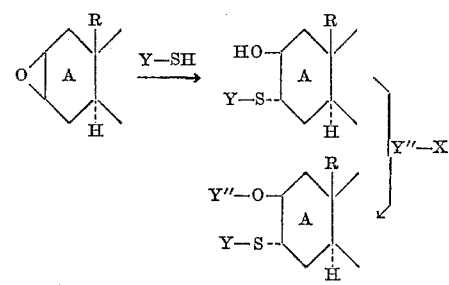

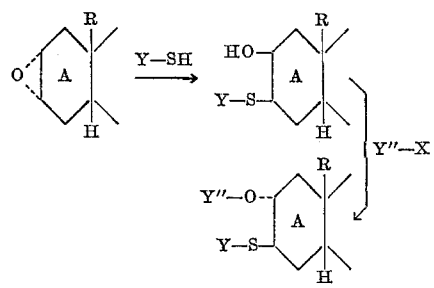

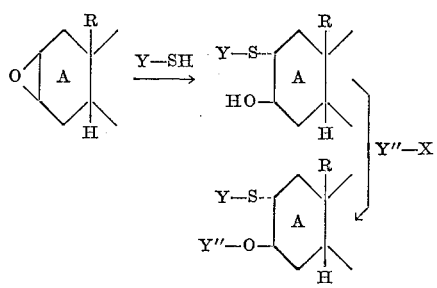

where Y″ is lower alkanoyl, lower alkylsulfonyl, phenylsulfonyl or lower alkylphenylsulfonyl, X is halogen or hydroxy and Y and R has the same significance as designated above. Examples of the starting material (II or III) include 2β-thiocyanato-5α-cholestan-3α-ol,
2β-thiocyanato-3α-methanesulfonyloxy-5α-cholestane,
2β-thiocyanato-3α-benzenesulfonyloxy-5α-cholestane,
3α-thiocyanato-5α-cholestan-2β-ol,
2β-ethanesulfonyloxy-3α-thiocyanato-5α-cholestane,
2β-acetylthio-5α-cholestan-3α-ol,
2β-propionylthio-3α-propionyloxy-5α-cholestane,
3β-thiocyanato-5β-cholestan-2α-ol,
2α-thiocyanato-5β-cholestan-3β-ol,
2α-acetylthio-3β-acetyloxy-5β-cholestane,
2β-thiocyanato-3α-hydroxy-5α-cholanic acid,
methyl 2α-thiocyanto-3β-acetyloxy-5β-cholanate,
2α-ethoxythiocarbonylthio-3β-acetyloxy-5α-estran-17β-ol,
2α-thiocyanato-3β-methanesulfonyloxy-5α-estran-17β-ol 17-acetate,
2α-thiocyanato-3β-acetyloxy-5α-estran-17β-ol 17-propionate,
2β-thiocyanato-3α-hydroxy-5α-androstan-17-one,
2β-acetyloxy-3α-thiocyanato-5α-androstan-17-one,
2β-p-toluenesulfonyloxy-3α-thiocyanato-5α-androstan-17-one,
2β-thiocyanato-3α-methanesulfonyloxy-5α-androstan-17β-ol 17-acetate,
2α-acetyloxy-3β-thiocyanato-5β-androstan-17β-ol 17-acetate,
2α-acetylthio-3β-acetyloxy-5β-androstan-17β-ol 17-propionate,
2β-methanesulfonyloxy-3α-thiocyanato-5α-androstan-17β-ol 17-caprylate,
2β-methanesulfonyloxy-3α-thiocyanato-5α-androstan-17β-ol 17-(β-phenylpropionate),
2β-ethanesulfonyloxy-3α-thiocyanato-5α-androstan-17β-ol 17-(10-undecenoate),
2α-thiocyanato-3β-p-toluene-sulfonyloxy-5β-androstane-11,17-dione,
2β-thiocyanato-3α-hydroxy-5α-androstane-11,17-dione,
2β-methanesulfonyloxy-3α-thiocyanato-17α-methyl-5α-androstan-17β-ol,
3α-thiocyanato-17α-ethyl-5α-androstane-2β,17β-diol,
3α-thiocyanato-17α-vinyl-5α-androstane-2β,17β-diol,
3α-thiocyanato-17α-ethynyl-5α-androstane,2β,17β-diol,
2β-thiocyanato-3α-hydroxy-5α-pregnan-20-one,
2β-methanesulfonyloxy-3α-thiocyanato-5α-pregnan-20-one,
2β-acetyloxy-3α-acetylthio-5α-pregnan-20-one,
2β-acetyloxy-3α-thiocyanato-5α-pregnane-11,20-dione,
2β-methanesulfonyloxy-3α-thiocyanato-17α,21-dihydroxy-5α-pregnane-11,20-dione,
2β,11β-dihydroxy-3α-thiocyanato-5α-pregnan-20-one, etc.

According to the process of the present invention, the starting material (II or III) is treated with a basic agent to give the corresponding 2,3-epithio-steroid (I). As the basic agent, there may be employed a weak base such as alumina or a strong base such as potassium hydroxide or sodium hydroxide. Other basic agents such as sodium carbonate and potassium carbonate may be also employed. The reaction temperature may be adapted to the starting material and the basic agent employed. For the production of the objective compound in a good yield, it is generally preferred to carry out the reaction in an inert solvent medium (e.g. methanol, ethanol, propanol, benzene, toluene, petroleum ether, diglyme (diethyleneglycol) dimethyl ether)) under a relatively mild condition, i.e. at a temperature not higher than 100° C.

The configuration of the epithio group in the thus-produced 2,3-epithio-steroid (I) corresponds to that of the sulfur-containing group in the starting steroid. Specifically, the 2,3-epithio-steroids include 2β,3β-epithio-5α-cholestane,2α,3α-epithio-5α-cholestane,
2β,3β-epithio-5α-cholanic acid,
methyl 2α,3α-epithio-5β-cholanate,
2α,3α-epithio-5α-estran-17β-ol,
2α,3α-epithio-5α-estran-17β-ol 17-acetate,
2,3α-epithio-5α-estran-17β-ol 17-propionate,
2β,3β-epithio-5α-androstan-17-one,
2α,3α-epithio-5α-androstan-17-one,
2β,3β-epithio-5α-androstan-17β-ol 17-acetate,
2β,3β-epithio-5β-androstan,17β-ol 17-acetate,
2α,3α-epithio-5β-androstan-17β-ol 17-propionate,
2α,3α-epithio-5α-androstan-17β-ol 17-caprylate,
2α,3α-epithio-5α-androstan-17β-ol 17-(β-phenylpropionate),
2α,3α-epithio-5α-androstan-17β-ol 17-(10-undecenoate),
2α,3α-epithio-5β-androstane-11,17-dione,
2β,3β-epithio-5α-androstane-11,17-dione,
2α,3α-epithio-17α-methyl-5α-androstan-17β-ol,
2α,3α-epithio-17α-ethyl-5α-androstan-17β-ol,
2α,3α-epithio-17α-vinyl-5α-androstan-17β-ol,
2α,3α-epithio-17α-ethynyl-5α-androstan-17β-ol,
2β,3β-epithio-5α-pregnan-20-one,
2α,3α-epithio-5α-pregnan-20-one,
2α,3α-epithio-5α-pregnane-11,20-dione,
2α,3α-epithio-17α,21-dihydroxy-5α-pregnane-11,20-dione, etc.

The 2,3-epithio-steroid (I) prepared by the present process exhibits specific physiological activities. For instance, 2β,3β-epithio-5α-androstan-17β-ol 17-acetate produces marked inhibition of gonadotropin secretion at a total dose of 10 milligrams with the manifestation of slight androgenic response in the test using mice. Further, for instance, 2α,3α-epithio-5α-androstan-17β-ol 17-acetate produces marked inhibition of gonadotropin hypersecretion at a dose of not more than 0.1 milligram with concomitant androgenic response in the test using mice. This steroid also produces the complete block of ova-implantation, when subcutaneously administered to rats from the first day of pregnancy for 6 days at a dose of 1 milligram per day. This steroid also shows a favorable ratio of myotropic activity to androgenic activity, when orally administered to rats. Furthermore, for instance, 2α,3α-epithio-17α-methyl-5α-androstan-17β-ol produces potent myotropic and androgenic activities with a favorable myotropic/androgenic ratio by the oral administration to rats. The other disclosed 2,3-epithio-steroids show similar physiological activities.

The products of the present invention are useful as, for instance, controlling agents for disease of menopause, ovulation-inhibition agents, controlling agents for hypergonadism or precocious puberty, and as anabolic agents.

The following examples represent presently-preferred embodiments of the present invention, but it is to be understood that the examples are given by way of illustration only and not of limitation. The relationship of parts by weight to parts by volume is the same as that between grams and milliliters. Temperatures are set forth in degrees centigrade.

Example 1.—Preparation of 2β,3β-epithio-5α-cholestane

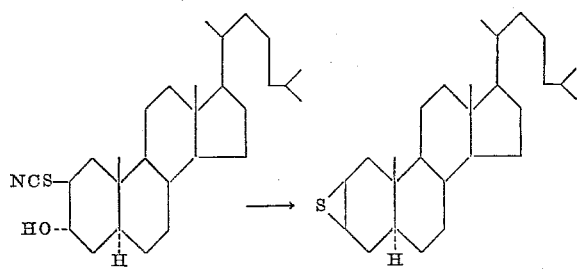

A solution of 2β-thiocyanato-5α-cholestan-3α-ol (2.27 parts by weight) and potassium hydroxide (5 parts by weight) in ethanol (100 parts by volume) is refluxed for 30 minutes. To the reaction mixture, there is added water. The precipitate is collected by filtration and crystallized from a mixture of ether and acetone to give 2β,3β-epithio-5α-cholestane (2.07 parts by weight) as scales melting at 120 to 122° C.

UV: $\lambda_{max.}^{ethanol}$ 262 mμ (ε: 48).

Analysis.—Calcd. for $C_{27}H_{46}S$: C, 80.52; H, 11.51; S, 7.96. Found: C, 80.73; H, 11.55; S, 7.89.

The starting material of this example, 2β-thiocyanato-5α-cholestan-3α-ol, can be prepared by reacting 2α,3α-epoxy-5α-cholestane [Striebel et al.: Helv. Chim. Acta, vol. 37, page 1094 (1954)] with an etheral solution of thiocyanic acid at room temperature.

Example 2.—Preparation of 2α,3α-epithio-5α-cholestane

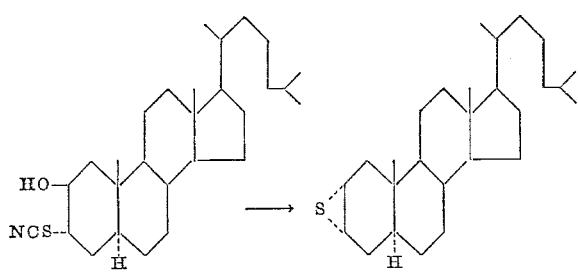

A solution of 3α-thiocyanato-5α-cholestan-2β-ol (1.70 parts by weight) and potassium hydroxide (1.5 parts by weight) in methanol (40 parts by volume) is refluxed for 10 minutes. To the reaction mixture, there is added water. The precipitate is collected by filtration and crystallized from acetone to give 2α-3α-epithio-5α-cholestane (1.25 parts by weight) as needles melting at 123 to 124° C.

UV: $\lambda_{max.}^{ethanol}$ 262 mμ (ε:48)

Aanlysis.—Calcd. for $C_{27}H_{46}S$: C, 80.52; H, 11.51, S, 7.96. Found: C, 8.85; H, 11.46; S, 7.71.

The starting material of this example, 3α-thiocyanato-5α-cholestan-2β-ol, can be prepared by reacting 2β,3β-epoxy-5α-cholestane [Corey: J. Am. Chem. Soc., vol. 75, page 4832 (1953)] with an etheral solution of thiocyanic acid at room temperature.

Example 3.—Preparation of 2β,3β-epithio-5α-cholestane

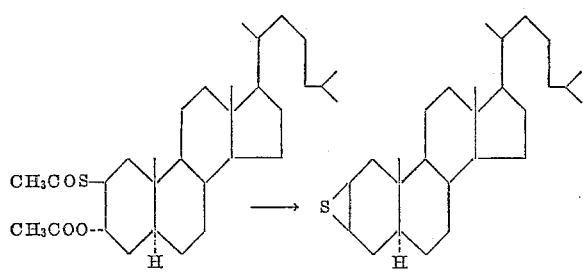

A solution of 2β-acetylthio-3α-acetyloxy-5α-cholestane (0.60 part by weight) and potassium hydroxide (1 part by weight) in methanol (20 parts by volume) is refluxed for 10 minutes. To the reaction mixture, there is added water. The precipitate is collected by filtration and crystallized from acetone to give 2β,3β-epithio-5α-cholestane (0.46 part by weight) as scales melting at 120 to 122° C.

The starting material of this example, 2β-acetylthio-3α-acetyloxy-5α-cholestane, can be prepared by reacting 2α,3α-epoxy-5α - cholestane with ethanethiolic acid while refluxing, followed by acetylating the resultant 2β-acetylthio-5α-cholestan-3α-ol in a conventional manner.

Example 4.—Preparation of 2β,3β-epithio-5α-androstan-17β-ol 17-acetate

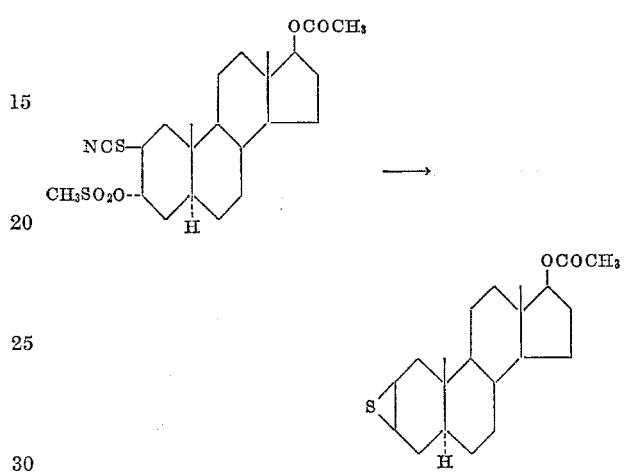

A solution of 2β - thiocyanato-3α-methanesulfonyloxy-5α-androstan-17β-ol 17-acetate (2.29 parts by weight) in a mixture of petroleum ether and benzene [4:1] (50 parts by volume) is treated with alumina (70 parts by weight) and allowed to stand for 48 hours at room temperature (around 15° C.). The eluate with benzene is evaporated to dryness and the residue (1.69 parts by weight) is crystallized from ethanol to give 2β,3β-epithio-5α-androstan-17β-ol 17-acetate (1.41 parts by weight) as scales melting at 162 to 164° C. $[α]_D^{16}$ +21.4±2° (in chloroform).

UV: $\lambda_{max.}^{ethanol}$ 263 mμ (ε: 49). IR: $\nu_{max.}^{Nujol}$ 1730, 1247 cm.$^{-1}$ Analysis.—Calcd. for $C_{21}H_{32}O_2S$: C, 72.36; H, 9.25; S, 9.20. Found: C, 72.39; H, 9.42; S, 8.92.

The starting material of this example, 2β-thiocyanato-3α - methanesulfonyloxy-5α-androstan-17β-ol 17 - acetate, can be prepared by reacting 2α,3α-epoxy-5α-androstan-17β-ol 17-acetate [J. Fajkos et al.: Chem. Abstracts, vol. 53, page 5342 (1959)] with an etheral solution of thiocyanic acid at room temperature, followed by reacting the resultant 2β - thiocyanato-5α-androstane-3α,17β - diol 17-acetate with methanesulfonyl chloride in pyridine at a temperature between 0 and 10° C.

Example 5.—Preparation of 2β,3β-epithio-5α-androstan-17β-ol 17-acetate

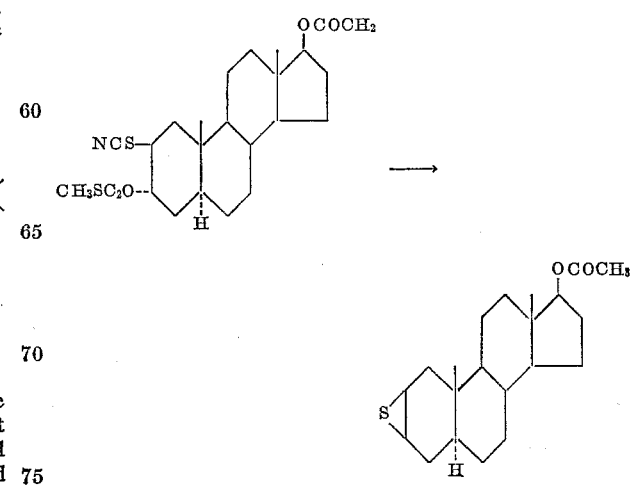

A solution of 2β - thiocyanato-3α-methanesulfonyloxy-5α-androstan-17β-ol 17-acetate (0.97 part by weight) and potassium hydroxide (1 part by weight) in diglyme (20 parts by volume) is stirred for 48 hours at room temperature (around 15° C.). To the reaction mixture, there is added water whereby crystals are precipitated. The crystals are collected by filtration, washed with water, dried and recrystallized from ethanol to give 2β,3β-epithio-5α-androstan-17β-ol 17-acetate (0.50 part by weight) as plates melting at 156° C. The ethanolic mother liquor is chromatographed on alumina. The eluate with a mixture of benzene and petroleum ether [1:4] is evaporated to dryness whereby the additional product (0.05 part by weight) is obtained. This additional product is combined together with the previously obtained product and recrystallized from ethanol to give pure crystals melting at 162 to 164° C.

*Example 6.—Preparation of 2β,3β-epithio-5α-androstan-17β-ol*

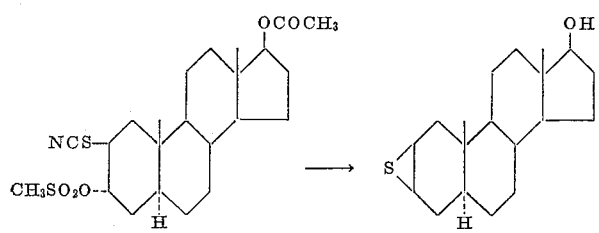

A solution of 2β - thiocyanato-3α-methanesulfonyloxy-5α-androstan-17β-ol 17-acetate (0.82 part by weight) and potassium hydroxide (0.9 part by weight) in diglyme (20 parts by volume) is refluxed on a water bath for 24 hours while stirring. To the reaction mixture, there is added water, and the separated substance is collected by filtration and crystallized from hexane to give 2β,3β-epithio-5α-androstan-17β-ol (0.60 part by weight) as crystals melting at 132.5 to 134° C.

*Example 7.—Preparation of 2α,3α-epithio-5α-androstan-17β-ol 17-acetate*

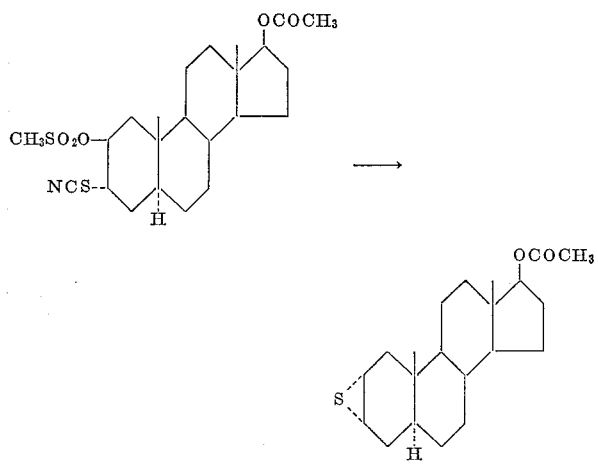

A solution of 2β-methanesulfonyloxy-3α-thiocyanato-5α-androstan-17β-ol 17-acetate (1.79 parts by weight) and potassium hydroxide (1.5 parts by weight) in diglyme (36 parts by volume) is stirred for 41.5 hours at room temperature (around 15° C.). To the reaction mixture, there is added water, and the resultant mixture is shaken with chloroform. The chloroform layer is washed with water, dried and evaporated to dryness. The residue (1.2 parts by weight) is chromatographed on alumina. The eluates with petroleum ether and a mixture of benzene and petroleum ether [1:9] are evaporated and crystallized from methanol to give 2α,3α-epithio-5α-androstan-17β-ol 17-acetate (0.19 part by weight) as plates melting at 144 to 145° C. $[\alpha]_D^{23.5}+22.0$ (c.=1.102 in chloroform).

UV: $\lambda_{max}^{ethanol}$ 207 mμ (ε: 2070), 264 mμ (ε: 53). IR: $\nu_{max}^{chloroform}$ 1735, 1243 cm.$^{-1}$

*Analysis.*—Calcd. for $C_{21}H_{32}O_2S$: C, 72.38; H, 9.26; S, 9.19. Found: C, 72.55; H, 9.24; S, 9.14.

The above alumina is then eluted with benzene and the eluate is evaporated to dryness. The residue is crystallized from acetone to give 2α,3α-epithio-5α-androstan-17β-ol (0.53 part by weight) as prisms melting at 123 to 125° C. This substance is acetylated by heating with a mixture of pyridine and acetic anhydride for 2 hours to give the additional amount (0.46 part by weight) of 2α,3α-epithio-5α-androstan-17β-ol 17-acetate.

The starting material of this example, 2β-methanesulfonyloxy - 3α-thiocyanato-5α-androstan-17β-ol 17-acetate, can be prepared by reacting 2β,3β-epoxy-5α-androstan-17β-ol 17-acetate [J. Fajkos et al.: Chem. Abstracts, vol. 53, page 5343 (1959)] with an etheral solution of thiocyanic acid at room temperature, followed by reacting the resultant 3α-thiocyanato-5α-androstane-2β,17β-diol 17-acetate with methanesulfonyl chloride in pyridine at a temperature between 0 and 10° C.

*Example 8.—Preparation of 2α,3α-epithio-5α-androstan-17β-ol 17-acetate*

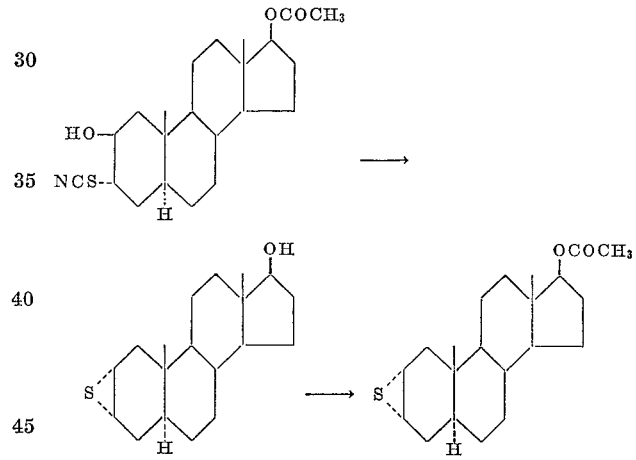

A solution of 3α-thiocyanato-5α-androstane-2β,17β-diol 17-acetate (0.30 part by weight) and potassium carbonate (1.5 parts by weight) in methanol (30 parts by volume) is allowed to stand at room temperature (around 15° C.) overnight. After addition of water to the reaction mixture, the precipitated crystals are collected by filtration, washed with water and dried to give 2α,3α-epithio-5α-androstan-17β-ol (0.27 part by weight). This substance is acetylated by allowing to stand with a mixture of pyridine and acetic anhydride at room temperature overnight. The resultant mixture, after the addition of water thereto, is shaken with ether. The ether extract is washed with water and dried, and the solvent removed. The residue is crystallized from methanol to give 2α,3α-epithio-5α-androstan-17β-ol 17-acetate (0.21 part by weight) as plates melting at 144 to 145° C.

*Example 9.—Preparation of 2α,3α-epithio-5α-androstan-17β-ol 17-propionate*

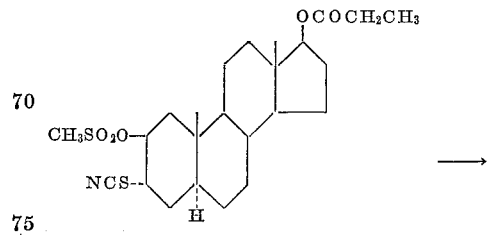

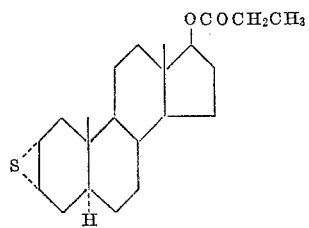

2β-methanesulfonyloxy-3α-thiocyanato-5α - androstan-17β-ol 17-propionate is treated with potassium hydroxide in diglyme as in Example 7 to give 2α,3α-epithio-5α-androstan-17β-ol 17-propionate as crystals melting at 142 to 143° C. $[\alpha]_D^{22.5}+23.2\pm2°$ (c.=1.0394 in chloroform).

IR: $\nu_{max.}^{Nujol}$ 1723 cm.$^{-1}$

*Analysis.*—Calcd. for $C_{22}H_{34}O_2S$: C, 72.88; H, 9.45; S, 8.84. Found: C, 73.00; H, 9.45; S, 8.98.

The starting material of this example, 2β-methanesulfonyloxy-3α-thiocyanato-5α-androstan-17β-ol 17-propionate, can be prepared by acylating 2β,3β-epoxy-5α-androstan-17β-ol [J. Fajkos et al.: Chem. Abstracts, vol. 53, page 5343 (1959)] with propionyl chloride in pyridine to 2β,3β-epoxy-5α-androstan-17β-ol 17-propionate and reacting the latter with thiocyanic acid in ether, followed by reacting the resultant 3α-thiocyanato-5α-androstane-2β,17β-diol 17-propionate with methanesulfonyl chloride in pyridine.

*Example 10.*—Preparation of 2α,3α-epithio-5α-androstan-17β-ol 17-caprylate

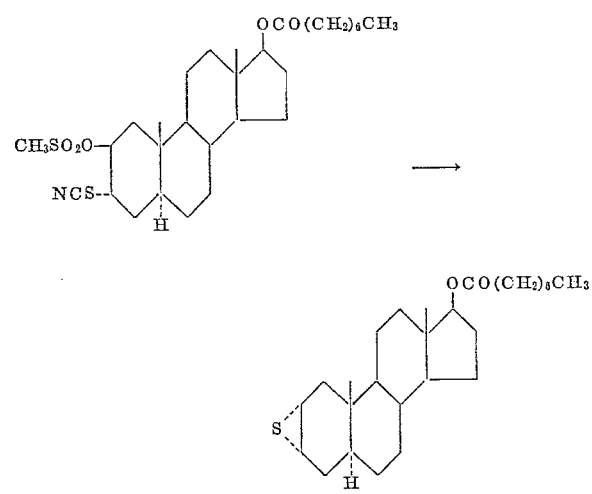

2β-methanesulfonyloxy-3α-thiocyanato-5α - androstan-17β-ol 17-caprylate is treated with potassium hydroxide in diglyme as in Example 7 to give 2α,3α-epithio-5α-androstan-17β-ol 17-caprylate as scales melting at 100 to 101.5° C. $[\alpha]_D^{25}+16.2\pm2°$ (c.=1.006 in chloroform).

IR: $\nu_{max.}^{Nujol}$ 1729, 1179 cm.$^{-1}$

*Analysis.*—Calcd. for $C_{27}H_{44}O_2S$: C, 74.94; H, 10.25; S, 7.41. Found: C, 74.93; H, 10.17; S, 7.33.

The starting material of this example, 2β-methanesulfonyloxy-3α-thiocyanato-5α-androstan-17β-ol 17-caprylate, can be prepared by acylating 2β,3β-epoxy-5α-androstan-17β-ol with caprylyl chloride in pyridine to 2β,3β-epoxy-5α-androstan-17β-ol 17-caprylate and reacting the latter with thiocyanic acid in ether, followed by reacting the resultant 3α-thiocyanato - 5α-androstane - 2β,17β-diol 17-caprylate with methanesulfonyl chloride in pyridine.

*Example 11.*—Preparation of 2α,3α-epithio-5α-androstan-17β-ol 17-(β-phenylpropionate)

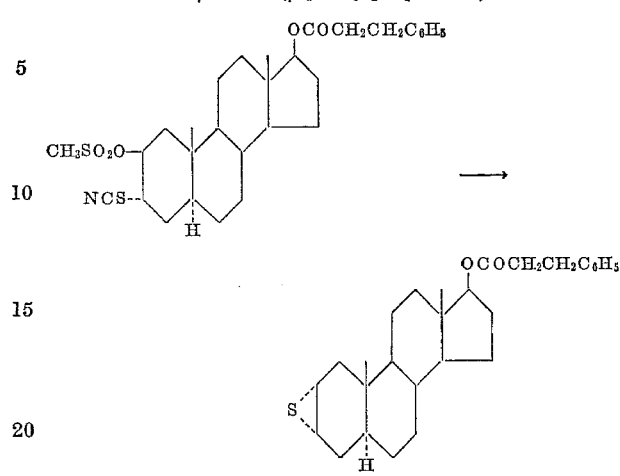

2β-methanesulfonyloxy-3α - thiocyanato-5α-androstan-17β-ol 17-(β-phenylpropionate) is treated with potassium hydroxide in diglyme as in Example 7 to give 2α,3α-epithio-5α - androsten-17β-ol 17-(β - phenylpropionate) as needles melting at 148 to 149° C. $[\alpha]_D^{25}+35.7\pm2°$ (c.=1.038 in chloroform).

IR: $\nu_{max.}^{Nujol}$ 1732, 1606, 1498, 1175, 755, 699 cm.$^{-1}$

*Analysis.*—Calcd. for $C_{28}H_{38}O_2S$: C, 76.66; H, 8.75; S, 7.31. Found: C, 76.87; H, 8.81; S, 7.33.

The starting material of this example, 2β-methanesulfonyloxy-3α-thiocyanato-5α-androstan-17β-ol 17-(β-phenylpropionate), can be prepared by acylating 2β,3β-epoxy-5α-androstan-17β-ol with β-phenylpropionyl chloride in pyridine to 2β,3β-epoxy-5α-androstan-17β-ol 17-(β-phenylpropionate) and reacting the latter with thiocyanic acid in ether, followed by reacting the resultant 3α-thiocyanato-5α-androstane-2β,17β-diol 17-(β-phenylpropionate) with methanesulfonyl chloride in pyridine.

*Example 12.*—Preparation of 2α,3α-epithio-5α-androstan-17β-ol 17-(10-undecenoate)

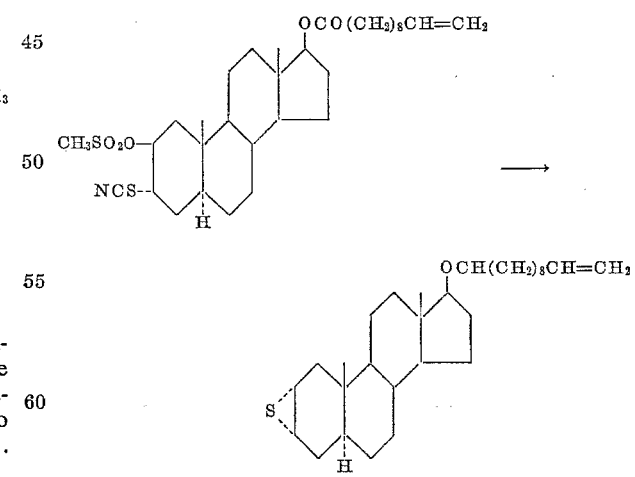

2β-methanesulfonyloxy - 3α - thiocyanato-5α-androstan-17β-ol 17-(10-undecenoate) is treated with potassium hydroxide in diglyme as in Example 7 to give 2α,3α-epithio-5α - androstan - 17β-ol 17 - (10-undecenoate) as crystals melting at 83.5 to 85° C.

*Analysis.*—Calcd. for $C_{30}H_{48}O_2S$: C, 76.22; H, 10.23; S, 6.78. Found: C, 76.26; H, 10.25; S, 6.84.

The starting material of this example, 2β-methanesulfonyloxy-3α-thiocyanato - 5α-androstan-17β-ol 17-(10-undecenoate), can be prepared by acylating 2β,3β-epoxy-5α-androstan-17β-ol with 10-undecenoyl chloride in pyridine to 2β,3β-epoxy-5α-androstan-17β-ol 17-(10-undecenoate) and reacting the latter with thiocyanic acid in ether, followed by reacting the resultant 3α-thiocyanato-5α - androstane - 2β,17β-diol 17-(10 - undecenoate) with methanesulfonyl chloride in pyridine.

*Example 13.—Preparation of 2α,3α-epithio-17α-methyl-5α-androstan-17β-ol*

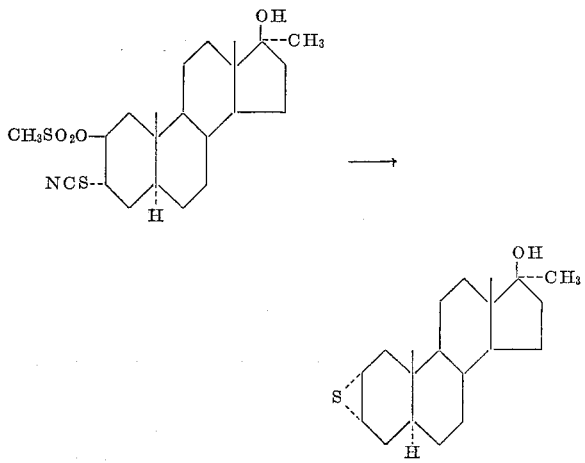

To a suspension of 2β-methansulfonyloxy-3α-thiocyanato-17α - methyl-5α - androstan - 17β-ol (2.15 parts by weight) in a mixture of diglyme (50 parts by volume) and tetrahydrofuran (10 parts by volume), there is added a solution of potassium hydroxide (2.5 parts by weight) in water (4 parts by volume), and the resultant solution is stirred overnight at room temperature (around 15° C.). To the reaction mixture, there is added water, and the resultant mixture is shaken with dichloromethane. The dichloromethane layer is washed with water, dried and evaporated to dryness. The residue is chromatographed on alumina (35 parts by weight). The eluates with a mixture of petroleum ether and benzene (1:2), benzene and a mixture of benzene and ether (95:5) are combined together, concentrated and crystallized from aqueous acetone to give 2α,3α-epithio-17α-methyl-5α-androstan-17β-ol (0.91 part by weight) as needles melting at 168 to 169° C. $[\alpha]_D^{23.5}+3.4\pm2°$ (c.=1.045 in chloroform).

IR: $\nu_{max}^{Nujol}$ 3356 cm.$^{-1}$

*Analysis.*—Calcd. for $C_{20}H_{32}OS$: C, 74.94; H, 10.06; S, 10.00. Found: C, 75.11; H, 10.17; S, 9.86.

The starting material of this example, 2β-methanesulfonyloxy-3α - thiocyanato-17α-methyl-5α - androstan-17β-ol, can be prepared by treating 2α-bromo-17α-methyl-17β-hydroxy-5α-androstan-3-one [Counsell et al.: J. Org. Chem., vol. 27, page 248 (1962)] with lithium tri-t-butoxy aluminum hydride, treating the resultant product was potassium hydroxide in isopropanol, treating the resulting 2β,3β-epoxy-17α-methyl-5α-androstan-17β-ol with thiocyanic acid in ether and treating the resultant 2β-hydroxy-3α-thiocyanato - 17α-methyl - 5α-androstan - 17β-ol with methanesulfonyl chloride in pyridine.

*Example 14.—Preparation of 2α,3α-epithio 17α-ethyl-5α-androstan-17β-ol*

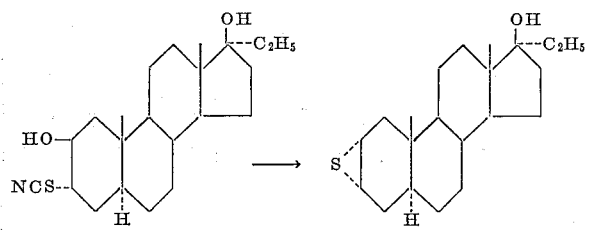

To a solution of 3α-thiocyanato-17α-ethyl-5α-androstane-2β,17β-diol (3.74 parts by weight) in dioxane (60 parts by volume), there are added a solution of potassium carbonate (5.5 parts by weight) in water (30 parts by volume) and methanol (100 parts by volume, and the resulting mixture is allowed to stand at room temperature (around 15° C.). The reaction mixture is concentrated under reduced pressure and water added thereto. The precipitate is collected by filtration, crystallized from a mixture of ether and petroleum ether and recrystallized from a mixture of acetone and hexane to give 2α,3α-epithio-17α-ethyl-5α-androstan-17β-ol (2.49 parts by weight) as crystals melting at 146 to 148° C. $[\alpha]_D^{27.5}+8.5\pm2°$ (c.=1.029 in chloroform).

IR: $\nu_{max}^{Nujol}$ 3660, 3630 cm.$^{-1}$

*Analysis.*—Calcd. for $C_{21}H_{34}OS$: C, 75.39; H, 10.24; S, 9.58. Found: C, 75.52; H, 10.35; S, 9.74.

The starting material of this example, 3α-thiocyanato-17α-ethyl-5α-androstane-2β,17β-diol, can be prepared by reacting 2β,3β-epoxy-5α-androstan-17-one [J. Fajkos et al.: Chem. Abstracts, vol. 53, page 5343 (1959)] with potassium acetylide in a mixture of tetrahydrofuran and ether at a room temperature, reducing catalytically the resultant 2β,3β - epoxy - 17α-ethynyl-5α-androstan-17β-ol-using palladium-calcium carbonate in ethyl acetate and reacting the resulting 2β,3β-epoxy-17α-ethyl-5α-androstan-17β-ol with an etheral solution of thiocyanic acid at room temperature.

*Example 15.—Preparation of 2α,3α-epithio-17α-vinyl-5α androstan-17β-ol*

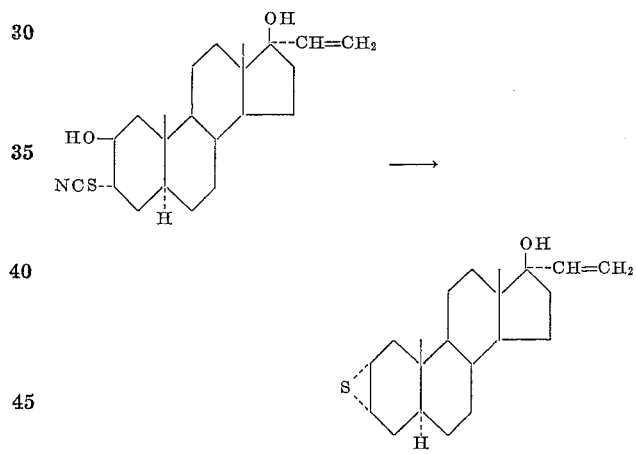

3α-thiocyanato-17α-vinyl-5α-androstane-2β,17β - diol is treated with potassium carbonate in a mixture of dioxane and water as in Example 14 to give 2α,3α-epithio-17α-vinyl-5α-androstan-17β-ol as crystals melting at 136 to 138° C. $[\alpha]_D^{27.5}+17.5 \pm2°$ (c.=1.043 in chloroform).

IR: $\nu_{max}^{Nujol}$ 3348, 3088, 1642, 1014, 924, 910 cm.$^{-1}$

*Analysis.*—Calcd. for $C_{21}H_{32}OS$: C, 75.85; H, 9.70; S, 9.64. Found: C, 75.98; H, 9.80; S, 9.86.

The starting material of this example, 3α-thiocyanato-17α-vinyl-5α-androstane-2β,17β-diol, can be prepared by reducing catalytically 2β,3β-epoxy-17α-ethynyl-5α-androstan-17β-ol using Lindlar catalyst in ethyl acetate and reacting the resulting 2β,3β-epoxy-17α-vinyl-5α-androstan-17β-ol with an etheral solution of thiocyanic acid at room temperature.

*Example 16.—Preparation of 2α,3α-epithio-17α-ethynyl-5α-androstan-17β-ol*

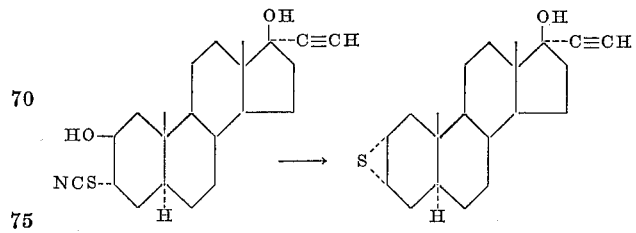

3α-thiocyanato-17α-ethynyl-5α-androstane-2β,17β - diol is treated with potassium carbonate in a mixture of dioxane and water as in Example 14 to give 2α,3α-epithio-17α-ethynyl-5α-androstan-17β-ol as crystals melting at 177 to 178° C. [α]$_D^{25.5}$ —19.0 ±2° (c.=1.038 in chloroform).

IR: $ν_{max}^{Nujol}$ 3405, 3294, 1047 cm.$^{-1}$

Analysis.—Calcd. for $C_{21}H_{30}OS$: C, 76.31; H, 9.15; S, 9.70. Found: C, 76.38; H, 9.00; S, 9.79.

The starting material of this example, 3α-thiocyanato-17α-ethynyl-5α-androstane-2β,17β-diol, can be prepared by reacting 2β,3β-epoxy-17α-ethynyl-5α-androstan-17β-ol with an etheral solution of thiocyanic acid at room temperature.

*Example 17.—Preparation of 2α,3α-epithio-5α-androstan-17-one*

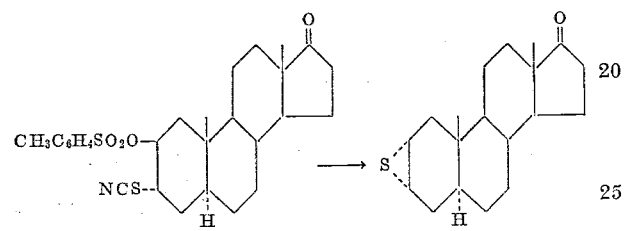

A solution of 2β-p-toluenesulfonyloxy-3α-thiocyanato-5α-androstan-17-one (1.98 parts by weight) and potassium hydroxide (1.5 parts by weight) in diglyme (40 parts by volume) is stirred for 48 hours at room temperature (around 15° C.). To the reaction mixture, there is added water, and the resultant mixture is shaken with a mixture of ether and chloroform. The organic solvent layer is washed with water, dried and evaporated to dryness. The residue (1.41 parts by weight) is crystallized from methanol to give 2α,3α-epithio-5α-androstan-17-one (1.18 parts by weight) as needles melting at 107 to 108° C. [α]$_D^{27.5}$+107.1 ±2° (c.=1.023 in chloroform).

IR: $ν_{max}^{Nujol}$ 1742 cm.$^{-1}$

Analysis.—Calcd. for $C_{19}H_{28}OS$: C, 74.94; H, 9.21; S, 10.53. Found: C, 74.64; H, 9.33; S, 10.42.

The said 2α,3α-epithio-5α-androstan-17-one is also prepared from 2α,3α-epithio-5α-androstan-17β-ol by oxidizing the latter with chromium troxide in pyridine at room temperature (around 15° C.) for about 20 hours.

The starting material of this example, 2β-p-toluenesulfonyloxy-3α-thiocyanato-5α-androstan-17-one, can be prepared by reacting 2β,3β-epoxy-5α-androstan-17-one [J. Fajkos et al.: Chem. Abstracts, vol. 53, page 5343 (1959)] with an etheral solution of thiocyanic acid at a room temperature, followed by reacting the resultant 2β-hydroxy-3α-thiocyanato-5α-androstan-17-one with p-toluenesulfonyl chloride in pyridine at a temperature between 0 and 10° C.

*Example 18.—Preparation of 2β,3β-epithio-5α-androstan-17-one*

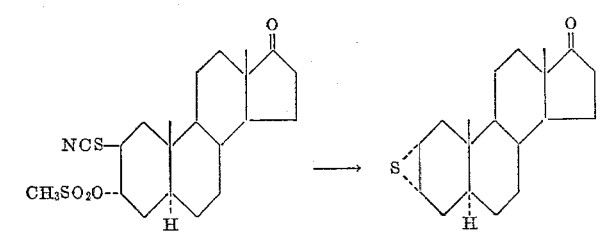

2β-thiocyanato-3α-methanesulfonyloxy-5α - androstan - 17-one is treated with potassium hydroxide in diglyme as in Example 17 to give 2β,3β-epithio-5α-androstan-17-one.

The starting material of this example, 2β-thiocyanato-3α-methanesulfonyloxy-5α-androstan-17-one, can be prepared by reacting 2α,3α-epoxy-5α-androstan-17-one [J. Fajkos et al.: Chem. Abstracts, vol. 53, page 5342 (1959)] with an etheral solution of thiocyanic acid at room temperature, followed by reacting the resultant 2β-thiocyanato-3α-hydroxy-5α-androstan-17-one with methanesulfonyl chloride in pyridine at a temperature between 0 and 10° C.

*Example 19.—Preparation of 2α,3α-epithio-5α-estran-17β-ol 17-acetate*

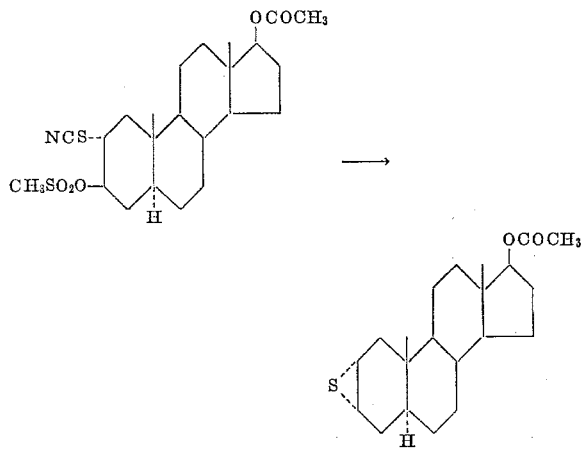

2α-thiocyanato-3β-methanesulfonyloxy-5α-estran-17β-ol 17-acetate is treated with potassium hydroxide in diglyme as in Example 17 to give 2α,3α-epithio-5α-estran-17β-ol 17-acetate.

The starting material of this example, 2α-thiocyanato-3β-methanesulfonyloxy-5α-estran-17β-ol 17-acetate, can be prepared by treating 2β-bromo-17β-acetyloxy-5α-estran-3-one [Djerassi et al.: J. Am. Chem. Soc., vol. 81, page 2386 (1959)] with an etheral solution of thiocyanic acid in the presence of an alkali, reducing the resultant 2α-thiocyanato-17β-acetyloxy-5α-estran-3-one with lithium tri-t-butoxy aluminum hydride and treating the resulting 2α-thiocyanato-5α-estrane-3β,17β-diol 17 - acetate with methanesulfonyl chloride in pyridine.

*Example 20.—Preparation of 2α,3α-epithio-5 pregnan-20-one*

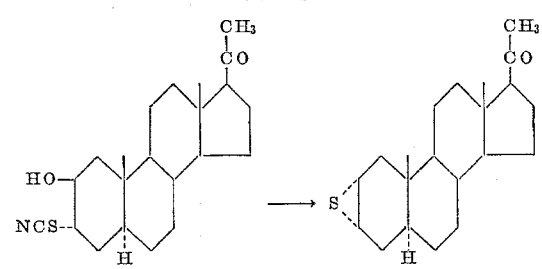

To a solution of 2β-hydroxy-3α-thiocyanato-5α-pregnan-20-one (3.00 parts by weight) in dioxane (50 parts by volume), there are added a solution of potassium carbonate (4.0 parts by weight) in water (20 parts by volume) and methanol (50 parts by volume), and the resultant mixture is stirred at room temperature (around 15° C.) overnight. Then, the reaction mixture is concentrated under reduced pressure and water added thereto. The precipitate is collected by filtration, washed with water, dried and crystallized from a mixture of dichloromethane and acetone to give 2α,3α-epithio-5α-pregnan-20-one (1.60 parts by weight) as crystals melting at 163 to 165° C. [α]$_D^{25.5}$+112.6 ±2° (c.=1.027 in chloroform).

IR: $ν_{max}^{Nujol}$ 1703 cm.$^{-1}$

Analysis.—Calcd. for $C_{21}H_{32}OS$: C, 75.86; H, 9.70; S, 9.62. Found: C, 75.62; H, 9.61; S, 9.83.

The starting material of this example, 2β-hydroxy-3α-thiocyanato-5α-pregnan-20-one, can be prepared by reacting 5α-pregn-2-en-20-one [J. v. Euw et al.: Helv. Chim. Acta, vol. 45, page 224 (1962)] with N-bromoacetamide and perchloric acid in dioxane, treating the resultant 2β-hydroxy-3α-bromo-5α-pregnan-20-one with potassium hydroxide in isopropanol and treating the resulting 2β,3β-epoxy-5α-pregnan-20-one with an etheral solution of thiocyanic acid.

*Example 21.—Preparation of 2α,3α-epithio-5α-pregnane-11,20-dione*

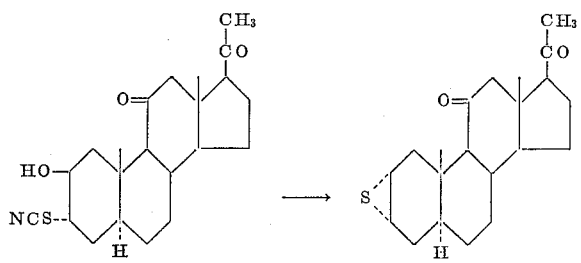

2β-hydroxy-3α-thiocyanato-5α-pregnane-11,20-dione is treated with potassium carbonate in a mixture of dioxane, water and methanol as in Example 20 to give 2α,3α-epithio-5α-pregnane-11,20-dione.

The starting material of this example, 2β-hydroxy-3α-thiocyanato-5α-pregnane-11,20-dione, can be prepared by reacting 5α-pregn-2-ene-11,20-dione [W. Nagata et al.: Helv. Chim. Acta, vol. 42, page 1399 (1959)] with N-bromoacetamide and perchloric acid in dioxane, treating the resultant 2β-hydroxy-3α-bromo-5α-pregnane-11,20-dione with potassium hydroxide in isopropanol and treating the resulting 2β,3β-epoxy-5α-pregnane-11,20-dione with an etheral solution of thiocyanic acid.

*Example 22.—Preparation of 2α,3α-epithio-11β-hydroxy-5α-pregnan-20-one*

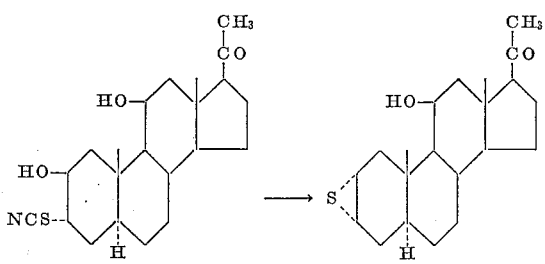

2β,11β-dihydroxy-3α-thiocyanato-5α-pregnan-20-one is treated with potassium carbonate in a mixture of dioxane, water and methanol as in Example 20 to give 2α,3α-epithio-11β-hydroxy-5α-pregnan-20-one.

The starting material of this example, 2β,11β-dihydroxy-3α-triocyanato-5α-pregnan-20-one, can be prepared by reacting 3β,11β-dihydroxy-5α-pregnan-20-one [H. Wehrli et al.: Helv. Chim. Acta, vol. 44, page 1927 (1961)] with p-toluenesulfonyl chloride in pyridine, reacting the resulting 3β-p-toluenesulfonyloxy-11β-hydroxy-5α-pregnan-20-one with collidine in xylene, reacting the resultant 11β-hydroxy-5α-pregn-2-en-20-one with N-bromoacetamide and perchloric acid in dioxane, treating the resultant 2β,11β-dihydroxy-3α-bromo-5α-pregnan-20-one with potassium hydroxide in isopropanol and treating the resulting 2β,3β-epoxy-11β-hydroxy-5α-pregnan-20-one with an etheral solution of thiocyanic acid.

*Example 23.—Preparation of 2α,3α-epithio-5α-pregnan-20-one*

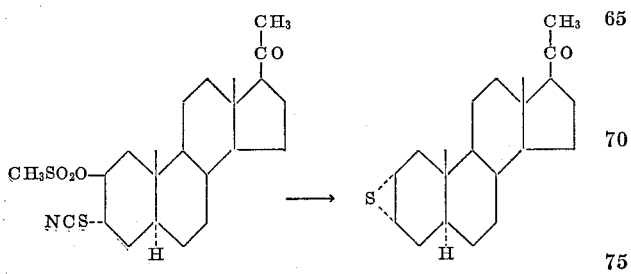

A solution of 2β-methanesulfonyloxy-3α-thiocyanato-5α-pregnan-20-one (5.50 parts by weight) in tetrahydrofuran (80 parts by volume) is combined with potassium hydroxide (5.50 parts by weight) and isopropanol (10 parts by volume), and the resultant mixture is stirred for 1.5 hours at room temperature (around 15° C.). The reaction mixture is combined with water. The precipitate is collected by filtration, washed with water, dried and crystallized from a mixture of dichloromethane and acetone to give 2α,3α-epithio-5α-pregnan-20-one (2.06 parts by weight) as crystals melting at 163 to 165° C.

The starting material of this example, 2β-methanesulfonyloxy-3α-thiocyanato-5α-pregnan-20-one, can be prepared by reacting 2β-hydroxy-3α-thiocyanato-5α-pregnan-20-one with methanesulfonyl chloride in pyridine.

In the similar manner, there are produced various 2,3-epithio-steroids: e.g.

2α,3α-epithio-5β-cholestane,
2β,3β-epithio-5α-cholanic acid,
methyl 2α,3α-epithio-5β-cholanate,
2β,3β-epithio-5α-androstan-17β-ol
17-lower alkanoate such as
2β,3β-epithio-5α-androstan-17β-ol 17-propionate,
2β,3β-epithio-5α-androstan-17β-ol 17-butyrate and
2β,3β-epithio-5α-androstan-17β-ol 17-caprylate,
2α,3α-epithio-5α-androstan-17β-ol 17-lower alkanoate such as
2α,3α-epithio-5α-androstan-17β-ol 17-butyrate and
2α,3α-epithio-5α-androstan-17β-ol 17-caproate,
2α,3α-epithio-17α-lower alkyl-5α-androstan-17β-ol such as
2α,3α-epithio-17α-propyl-5α-androstan-17β-ol,
2α,3α-epithio-17α-lower alkenyl - 5α - androstan-17β-ol such as
2α,3α-epithio-17α-propenyl-5α-androstan-17β-ol,
2α,3α-epithio-17α-lower alkynyl-5α-androstan-17β-ol such as
2α,3α-epithio-17α-propynyl-5α-androstan-17β-ol,
2β,3β-epithio-5β-androstan-17-one,
2α,3α-epithio-5α-estran-17β-ol
17-lower alkanoate such as
2α,3α-epithio-5α-estran-17β-ol 17-propionate,
2α,3α-epithio-5α-estran-17β-ol 17-butyrate and
2α,3α-epithio-5α-estran-17β-ol 17-capyrylate, etc.

What is claimed is:
1. A 2,3-epithio-steroid of the formula:

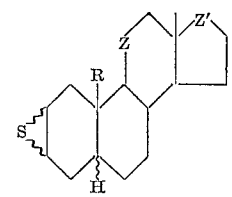

wherein R is a member selected from the group consisting of hydrogen and methyl, Z is a member selected from the group consisting of methylene, hydroxymethylene and carbonyl, Z' is a member selected from the group consisting of carbonyl,

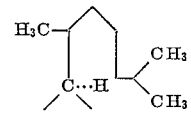

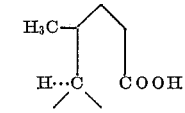

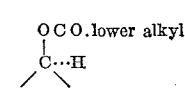

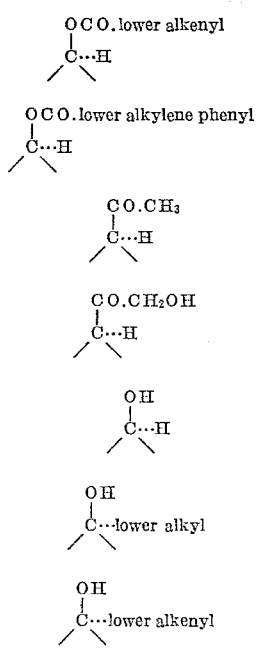

and

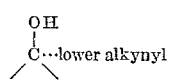

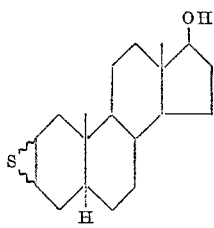

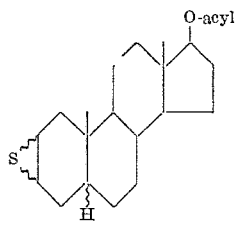

and the ripple mark (⸮) is a generic indication of α- and β-configurations.

2. A 2,3-epithio-steroid of the formula:

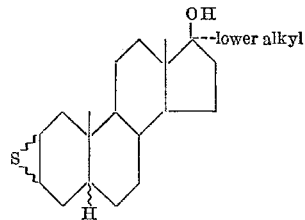

wherein the ripple mark (⸮) is a generic indication of α- and β-configurations.

3. 2α,3α-epithio-5α-androstan-17β-ol.
4. 2β,3β-epithio-5α-androstan-17β-ol.
5. A 2,3-epithio-steroid of the formula:

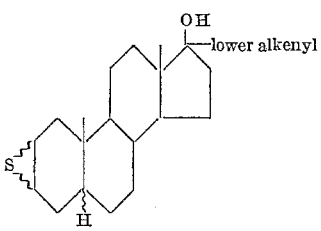

wherein the acyl moiety is a carboxylic acyl radical having from one to twelve carbon atoms and a molecular weight less than about 200, and the ripple mark (⸮) is a generic indication of α- and β-configurations.

6. 2α,3α-epithio-5α-androstan-17β-ol 17-acetate.
7. 2α,3α-epithio-5α-androstan-17β-ol-17-propionate.
8. 2α,3α-epithio-5α-androstan-17β-ol-17-caprylate.
9. 2α,3α - epithio - 5α-androstan-17β-ol-17-(β-phenylpropionate).
10. 2α,3α - epithio-5α-androstan - 17β-ol 17 - (10-undecanoate).
11. 2β,3β-epithio-5α-androstan-17β-ol 17-acetate.

12. A 2,3-epithio-steroid of the formula:

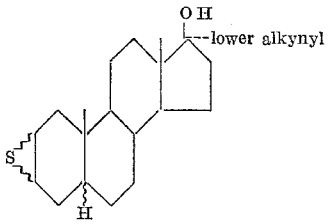

wherein the ripple mark (⸮) is a generic indication of α- and β-configurations.

13. 2α,3α-epithio-17α-methyl-5α-androstan-17β-ol.
14. A 2,3-epithio-steroid of the formula:

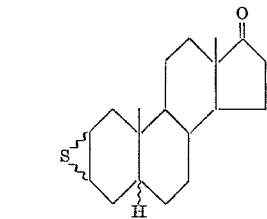

wherein the ripple mark (⸮) is a generic indication of α- and β-configurations.

15. 2α,3α-epithio-17α-vinyl-5α-androstan-17β-ol.
16. A 2,3-epithio-steroid of the formula:

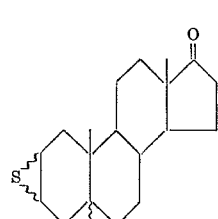

wherein the ripple mark (⸮) is a generic indication of α- and β-configurations.

17. 2α,3α-epithio-17α-ethynyl-5α-androstan-17β-ol.
18. A 2,3-epithio-steroid of the formula:

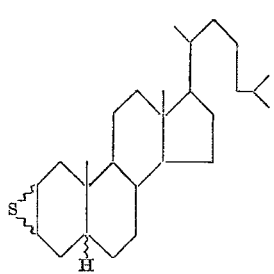

wherein the ripple mark (⸮) is a generic indication of α- and β-configurations.

19. 2α,3α-epithio-5α-androstan-17-one.
20. 2β,3β-epithio-5α-androstan-17-one.
21. A 2,3-epithio-steroid of the formula:

wherein the ripple mark (⸮) is a generic indication of α- and β-configurations.

22. A 2,3-epithio-steroid of the formula:

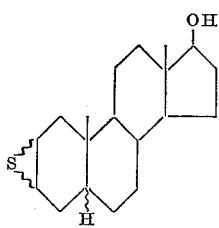

wherein the ripple mark (⸲) is a generic indication of α- and β-configurations.

23. A 2,3-epithio-steroid of the formula:

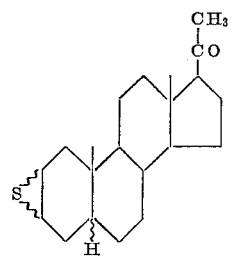

wherein the ripple mark (⸲) is a generic indication of α- and β-configurations.

24. A 2,3-epithio-steroid of the formula:

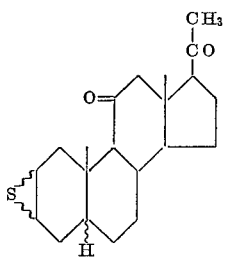

wherein the ripple mark (⸲) is a generic indication of α- and β-configurations.

25. A 2,3-epithio-steroid of the formula:

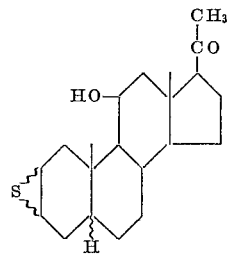

wherein the ripple mark (⸲) is a generic indication of α- and β-configurations.

No references cited.

LEWIS GOTTS, *Primary Examiner.*